April 8, 1947.　　　R. A. GOEPFRICH　　　2,418,632
BRAKE
Filed Dec. 1, 1943　　　5 Sheets-Sheet 1
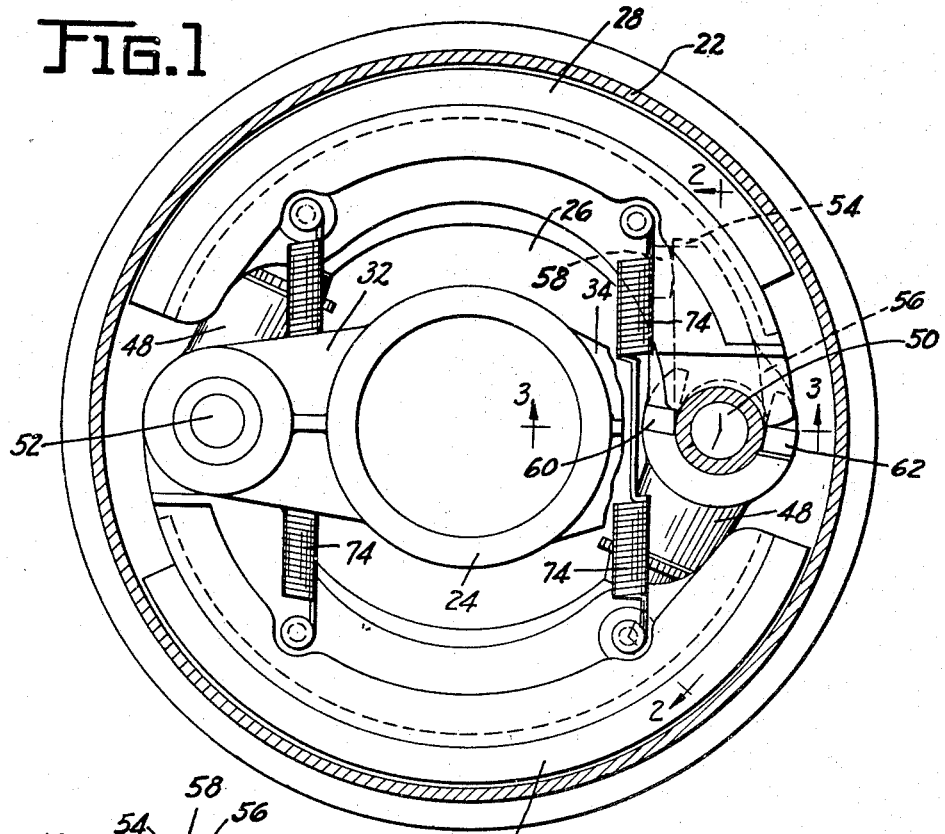
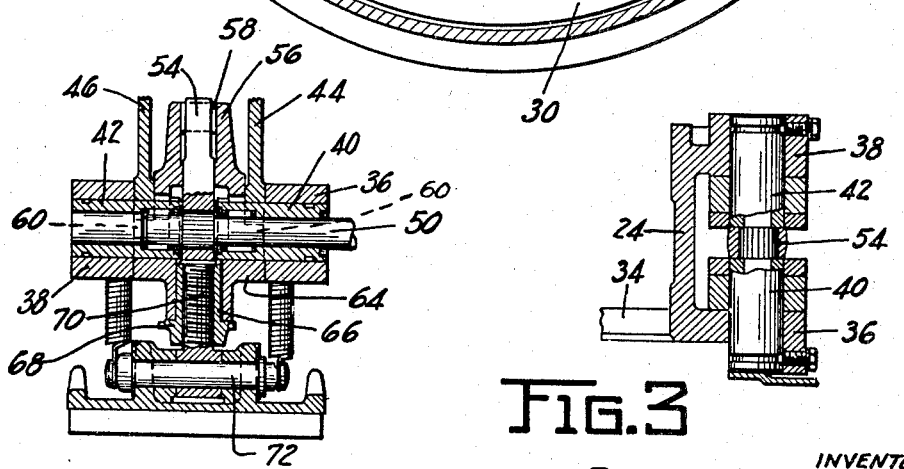
INVENTOR
RUDOLPH A. GOEPFRICH
BY
T. J. Plante
ATTY April 8, 1947.    R. A. GOEPFRICH    2,418,632
BRAKE
Filed Dec. 1, 1943    5 Sheets-Sheet 2

INVENTOR
RUDOLPH A. GOEPFRICH
BY T. J. Plante
ATTY

April 8, 1947.  R. A. GOEPFRICH  2,418,632
BRAKE
Filed Dec. 1, 1943  5 Sheets-Sheet 3

INVENTOR
RUDOLPH A. GOEPFRICH
BY
ATTY

April 8, 1947. R. A. GOEPFRICH 2,418,632
BRAKE
Filed Dec. 1, 1943 5 Sheets-Sheet 4

INVENTOR
RUDOLPH A. GOEPFRICH
BY
T. J. Plante
ATTY.

April 8, 1947.  R. A. GOEPFRICH  2,418,632
BRAKE
Filed Dec. 1, 1943  5 Sheets-Sheet 5

INVENTOR
RUDOLPH A. GOEPFRICH
BY
ATTY

Patented Apr. 8, 1947

2,418,632

UNITED STATES PATENT OFFICE 2,418,632

BRAKE

Rudolph A. Goepfrich, South Bend, Ind., assignor to Bendix Aviation Corporation, South Bend, Ind., a corporation of Delaware Application December 1, 1943, Serial No. 512,429

12 Claims. (Cl. 188—78)

This invention relates to brakes, and is illustrated as embodied in a brake of the internal expanding shoe type.

An object of the present invention is to simplify and at the same time increase the operating effectiveness of a brake of the type wherein mechanical applying means are used to actuate one or more friction elements which anchor at either end depending upon the direction in which the brake drum is rotating.

A further object of the present invention is to simplify and at the same time increase the operating effectiveness of a brake of the type wherein mechanical applying means are used to actuate simultaneously two shoes which are individually capable of anchoring at either end depending upon the direction in which the brake drum is rotating.

A still further, and more specific, object of the present invention is to provide a mechanically applied brake wherein both the anchoring force and the applying force act substantially centrally of the anchor and the applying mechanism, respectively, thus avoiding cantilever loading of these parts, and consequent tendency to deflection thereof.

Other objects and advantages of my invention will become apparent during the course of the following description, reference being had therein to the accompanying drawings, in which:

Figure 1 is a vertical section taken through a brake assembly, showing the brake shoes in side elevation;

Figures 2 and 3 are sections taken on the lines 2—2 and 3—3, respectively, of Figure 1;

Figure 4 is a vertical section taken through a brake assembly, showing a modified embodiment of my invention;

Figures 5 and 6 are sections taken on the lines 5—5 and 6—6, respectively, of Figure 4;

Figure 4:
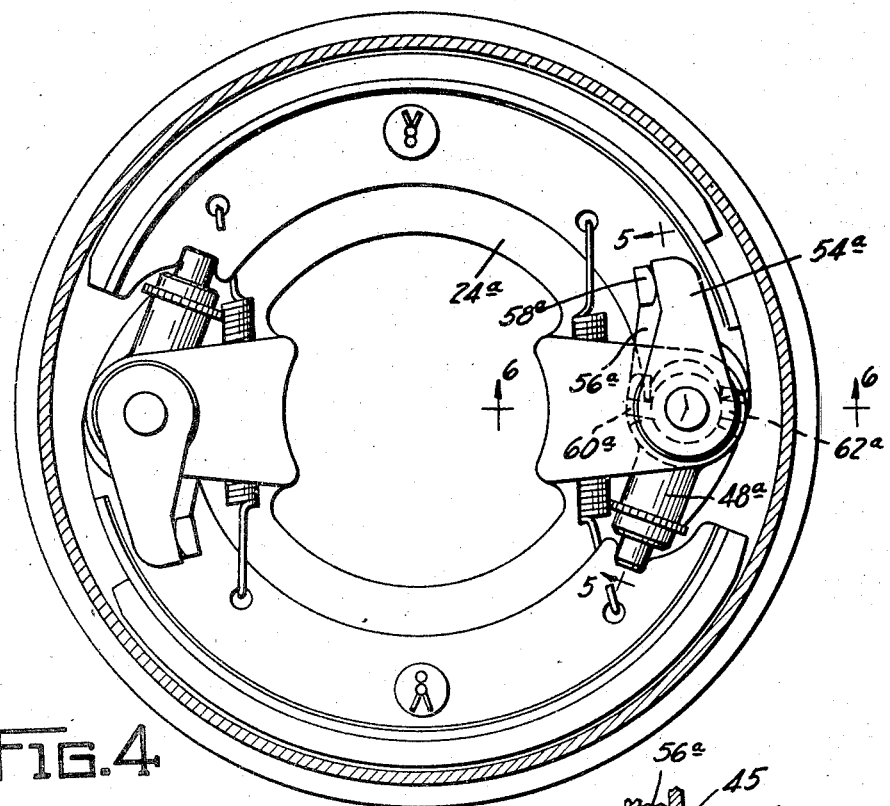

The several brakes illustrated are of the type having two shoes, each of which is capable of anchoring at either end depending on the direction of rotation of the brake drum. The principles of my invention are particularly useful in a brake of this type. However, certain of these principles are adaptable to any brake having at least one friction element which is adapted to anchor at either end depending on the direction of drum rotation.

In Figures 1 to 3, inclusive, the rotatable brake drum is indicated at 22. A non-rotatable supporting member 24 is provided with a mounting flange 26 by means of which it is mounted on a non-rotating part of the vehicle, such as the steering knuckle or rear axle housing. Two shoes 28 and 30 are adapted to contact the drum and to transmit the braking torque therefrom to the support member 24 by means of either one or the other of the diametrically opposite pairs of projections extending radially outward from the support member 24. In Figure 1, the pair of projections at one side of the brake is indicated generally by the numeral 32, and the pair of projections at the opposite side of the brake is indicated generally by the numeral 34. As shown in Figure 3, each pair of projections includes a projection 36 and a projection 38 axially spaced therefrom. An anchor which extends parallel to the axis of the brake is supported between the projections 36 and 38. As seen most clearly in Figures 2 and 3, this anchor comprises two sleeves 40 and 42 supported in openings provided in the projections 36 and 38 respectively.

Each shoe is provided with two webs 44 and 46, and at one end of each shoe these webs are in contact with the anchor sleeves 40 and 42 respectively. At the other end of each shoe an adjustable link 48 is in contact with the anchor. Thus the anchor sleeves serve to position the shoes in release and also to take their anchoring torque when the shoes are in frictional contact with the drum.

As will be noted, the anchoring ends of the shoes are located axially between the projections 36 and 38, thus insuring that the anchoring load will be taken centrally of the anchors, and without the imposition of a cantilever load thereon.

The mechanical applying mechanism for the brake comprises two shafts 50 and 52, each journalled in the anchor supported by one pair of axially spaced projections. Located centrally of each shaft is an applying arm 54 splined thereto, and adapted to actuate a forked lever 56. The applying arm 54 bears against the junction 58 of the two sides or forks of the lever 56. The lever 56 is forked in order that the force exerted by the arm 54 may be simultaneously exerted against both webs of the adjacent shoe end or against both forks of the adjacent adjustable link, as the case may be. Each side of the lever 56 is provided with a lug 60 which exerts applying force against one of the shoes through the link 48, and a second lug 62 which exerts applying force against the other shoe.

The shoes may conveniently be described as forked at both ends adjacent the anchors, inasmuch as one anchoring end of each shoe has two webs, and the other anchoring end has the forked adjustable link 48. The adjustable link 48 comprises the anchoring member 64, a cylindrical sleeve 66 inserted therein and having a toothed head 68, and a screw 70 in threaded engagement with the interior of sleeve 66 and pivotally connected by means of a cross pin 72 with the two webs 44 and 46 of the shoe.

When it is desired to operate the brake, the two shafts 50 and 52 are rotated, turning the respective arms 54. Each arm exerts a force at 58 tending to turn the associated lever 56. Referring to the right side of Figure 1, it will be seen that movement of the arm 54 in a counterclockwise direction exerts a force on the lever tending to move it also in a counterclockwise direction. This causes the lug 60 to press against the adjustable link 48 tending to move shoe 30 into the drum, while lug 62 presses against the end of shoe 28 tending to move it also into the drum. Exactly the same operation occurs at the left side of the brake. Depending upon the direction, each of the shoes anchors at one end on the proper anchor sleeves, and is applied at the other end. When the applying pressure is released the shoes are returned to the original position (as shown in Figure 1) by means of the return springs 74.

It should be noted that a clearance is provided between the floating lever 56 and the anchor to permit the lever to pivot on one lug or the other, depending on which shoe is being pushed outwardly, in turn depending on the direction of drum rotation. This arrangement makes it possible for the floating lever to pivot and apply either shoe without interfering with the anchor sleeve. As the floating lever pivots at the outer point and pushes against the inner edge of the adjustable link, the grooved portion of the floating lever moves toward the anchor, and therefore, clearance is required.

Figure 5:
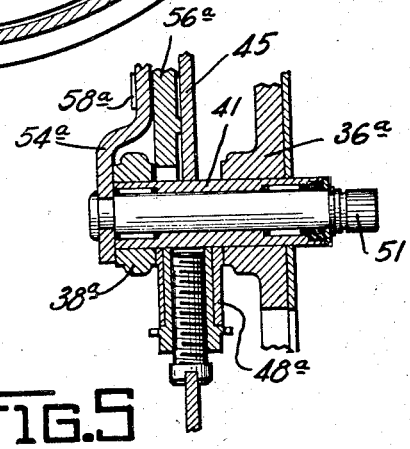
Figure 6:
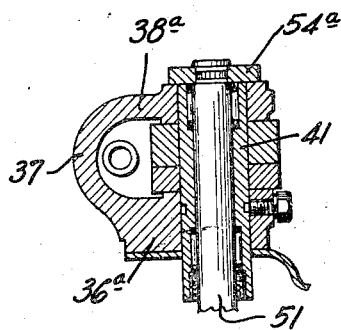

The brake of Figures 4 to 6, inclusive, differs from the brake of Figures 1 to 3 primarily in having a simpler construction, and in having the applying load applied off-center with respect to the shoes.

The shape of the support member 24a is somewhat different from that of the support member 24 in Figure 1. The member 24a has the shape of a flat ring and the anchoring projections 36a and 38a (see Figures 5 and 6) are connected together at each side of the brake by an inwardly curving portion 37. A single anchor sleeve 41 is journaled in the two projections 36a and 38a, to receive the anchoring torque of the shoes either through the single web 45 or the adjustable link 48a. The shaft 51 extends through the hollow anchor sleeve 41, and has secured thereto, at the inner end thereof, the arm 54a. This arm bears against a lug 58a on the lever 56a which has lugs 60a and 62a bearing against the ends of the respective shoes, one of said lugs acting through the adjustable link.

Figure 7:
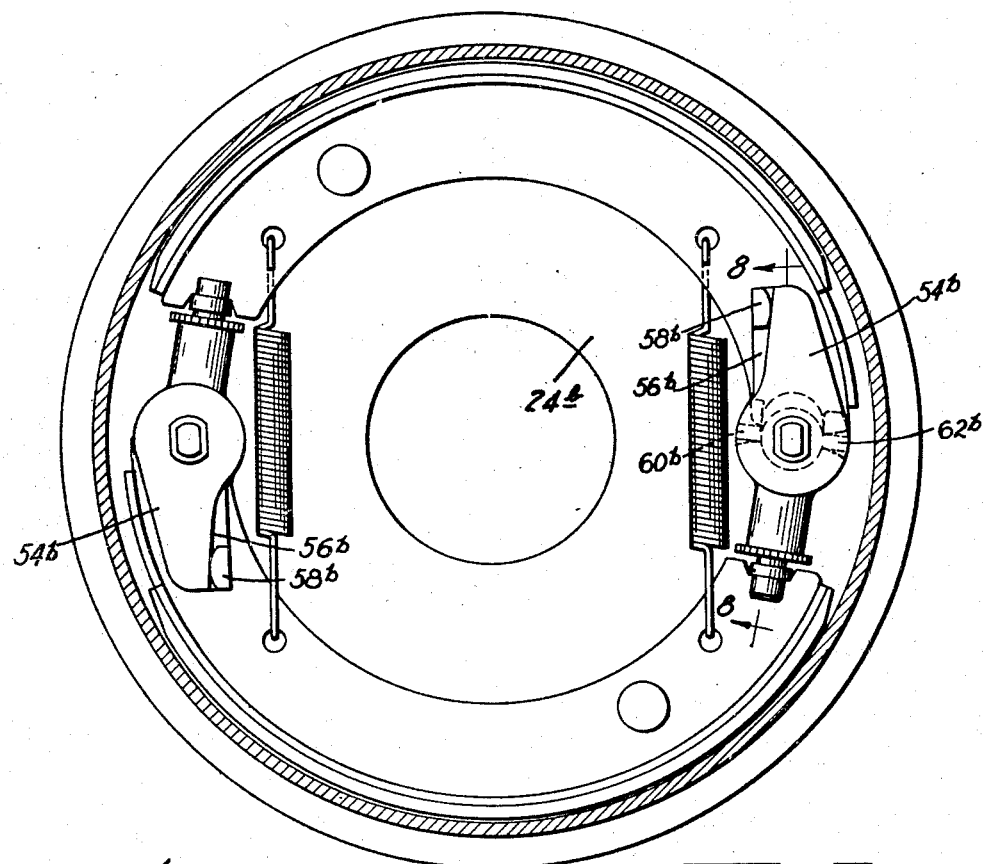
Figure 7 is a section taken through a brake assembly, showing another embodiment of my invention.
Figure 8:
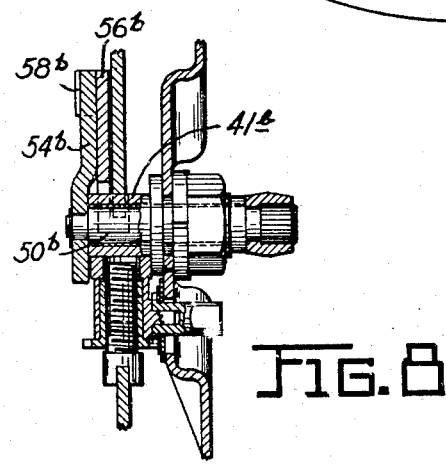
Figure 8 is a section taken on the line 8—8 of Figure 7.

The brake of Figures 7 and 8 differs from the brakes heretofore described primarily in having cantilever anchor loading. The support member 24b is a conventional backing plate, to which the anchor sleeve 41b is bolted. The actuating mechanism corresponds closely to that shown in Figures 4 to 6. An arm 54b, which is rotatable with the shaft 50b acts against a lug 58b formed on lever 56b, the lever in turn acting to spread the shoes at one side of the brake by means of the lugs 60b and 62b formed on the lever.

Figure 9:
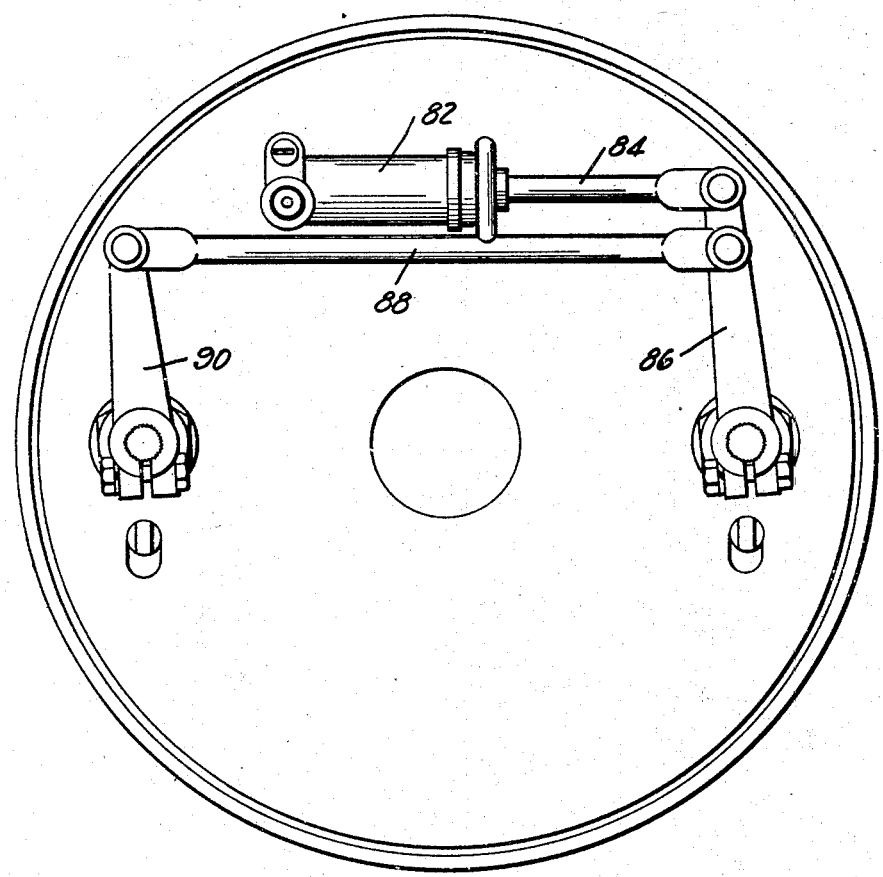
Figure 9 is a rear view of a brake assembly, showing applying means usable with any of the previously shown brake assemblies.

Figure 9 illustrates a possible method for simultaneously turning the two shafts 50 and 52 of any of the brakes thus far described. A hydraulic cylinder 82 located outside the brake drum is mounted on a suitable fixed member, and is connected by means of a rod 84 with an arm 86 which is splined to the end of one of the shafts, while a rod 88 connects the arm 86 to the arm 90, which is splined to the other shaft. Thus outward movement of the piston in the cylinder 82 moves rod 84 toward the right, turning arms 86 and 90 in a clockwise direction, thus applying force simultaneously to both ends of both brake shoes.

In the brake of Figure 7, the cylinder 82 may be mounted on the backing plate 24b. In the brakes of Figure 1 or Figure 4, the cylinder may be mounted either on a dust shield (usually provided) or on an extension of the support member provided for that purpose.

Figure 10:
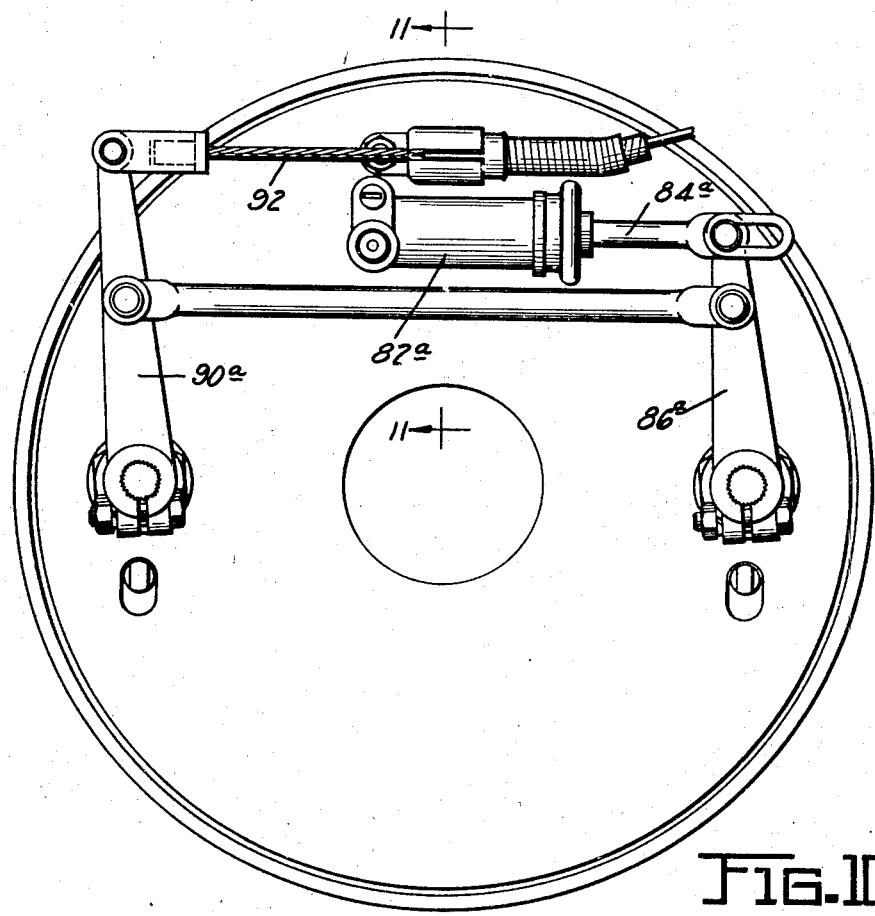
Figure 10 shows a modification of the applying means of Figure 9.
Figure 11:
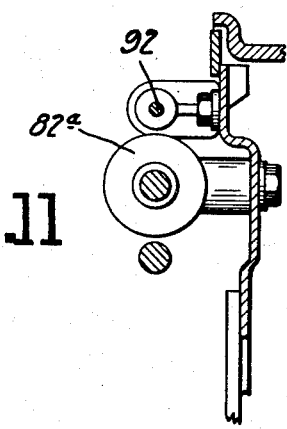
Figure 11 is a section taken on the line 11—11 of Figure 10.

Figures 10 and 11 show a modified version of the actuating means of Figure 9, wherein both hydraulic and mechanical means are provided for simultaneously turning both shafts 50 and 52. A mechanical force transmitting means, such as the cable 92 of a Bowden type cable and conduit mechanism, is connected to the arm 90a, and the rod 84a is connected to arm 86a by means of an overrunning connection, thus permitting either the cylinder 82a or the cable 92 to apply braking force independently.

Although certain specific embodiments of my invention have been described herein, the scope of my invention is not to be construed as limited to such embodiments, but as limited only by the terms of the appended claims.

I claim:

1. For use in a brake assembly having a rotatable drum, in combination, a non-rotatable support member having a pair of aligned substantially radially extending projections spaced axially from one another, an axially extending anchor supported between said projections, a shoe contacting said anchor between said projections and adapted to transmit braking torque to the anchor while in frictional contact with the drum, and mechanical applying means for moving said shoe into contact with the drum including an axially extending shaft supported by said projections and means for transmitting force from the shaft to the shoe in a plane passing through the axial center of the shoe.

2. For use in a brake assembly having a rotatable drum, in combination, a non-rotatable support member having a pair of aligned substantially radially extending projections spaced axially from one another, torque-taking means supported by said projections and extending parallel to the axis of the brake, a shaft journaled in said projections, an arm rotatable with said shaft and located centrally with respect to said projections, a shoe having a forked end axially straddling said arm and adapted to anchor on said torque-taking means, and means actuated by said arm for moving said shoe into contact with the drum.

3. For use in a brake assembly having a rotatable drum, in combination, a non-rotatable support member having a pair of aligned substantially radially extending projections spaced axially from one another, torque-taking means supported by said projections and extending parallel to the axis of the brake, a shaft journaled in said torque-taking means, an arm rotatable with said shaft and located centrally with respect to said projections, a shoe having a forked end axially straddling said arm and adapted to anchor on said torque-taking means, and means actuated by said arm for moving said shoe into contact with the drum, said last-named means comprising a forked lever having contact with said arm at the joining of the forks and having one side thereof in contact with each side of the forked shoe end.

4. For use in a brake assembly having a rotatable drum, in combination, a non-rotatable support member having a pair of aligned substantially radially extending projections spaced axially from one another, torque-taking means supported by said projections and extending parallel to the axis of the brake, a shaft journaled in said projections, an arm rotatable with said shaft and located centrally with respect to said projections, two shoes each having a forked end axially straddling said arm and adapted to anchor on said torque-taking means, and means actuated by said arm for spreading the ends of said shoes to bring the shoes into contact with the drum.

5. For use in a brake assembly having a rotatable drum, in combination, a non-rotatable support member having a pair of aligned substantially radially extending projections spaced axially from one another, torque-taking means supported by said projections and extending parallel to the axis of the brake, a shaft journaled in said projections, an arm rotatable with said shaft and located centrally with respect to said projections, a shoe having a forked end axially straddling said arm and adapted to anchor on said torque-taking means, and means actuated by said arm for moving said shoe into contact with the drum, the forked end of one of said shoes being part of an adjustable length link.

6. For use in a brake assembly having a rotatable drum, in combination, a non-rotatable support member having a pair of aligned substantially radially extending projections spaced axially from one another, torque-taking means supported by said projections and extending parallel to the axis of the brake, a shaft journaled in said projections, an arm rotatable with said shaft and located centrally with respect to said projections, a shoe having a forked end axially straddling said arm and adapted to anchor on said torque-taking means, and means actuated by said arm for moving said shoe into contact with the drum, said last-named means comprising a forked lever having contact with said arm at the junction of its forked sides and having each side of the fork in pivotal contact with one forked side of both shoe ends.

7. For use in cooperation with a rotatable drum, a brake comprising a non-rotatable support member having a sleeve supported thereon extending parallel to the axis of the brake, two shoes supported by said support member and adapted to be brought into frictional contact with the drum to oppose the rotation thereof, said shoes having adjacent separable ends normally resting against and therefore positioned by said sleeve, a shaft journaled in said sleeve, an arm on said shaft movable therewith as the shaft rotates, and a floating lever having pivotal connection with the arm and having a first lug extending between the ends of the shoes at one side of the sleeve and a second lug extending between the ends of the shoes at the other side of the sleeve, said lever being arranged to fulcrum through one of said lugs on the end of one shoe for one direction of drum rotation and through the other of said lugs on the end of the other shoe for reverse rotation.

8. For use in cooperation with a rotatable drum, a brake comprising a non-rotatable support member having a sleeve supported thereon extending parallel to the axis of the brake, two shoes supported by said support member and adapted to be brought into frictional contact with the drum to oppose the rotation thereof, said shoes having adjacent separable ends normally resting against and therefore positioned by said sleeve, a shaft journaled in said sleeve, an arm on said shaft movable therewith as the shaft rotates, and a lever having pivotal connection with the arm, and with both of the shoes, whereby the force exerted by the arm on the lever spreads the adjacent separable ends of the shoes to bring them into contact with the drum.

9. For use in cooperation with a rotatable drum, a brake comprising a non-rotatable support member having two diametrically opposite sleeves supported thereon and extending parallel to the axis of the brake, two shoes supported by said support member and adapted to anchor at either end according to the direction of drum rotation at the time of frictional contact with the drum, said shoes having adjacent separable ends at opposite sides of the brake normally resting against and therefore positioned by said sleeves, a shaft journaled in each of said sleeves, means actuated by turning the shafts on their axes to simultaneously urge both ends of both shoes toward the drum, and a hydraulic cylinder adapted to simultaneously turn both of said shafts.

10. For use in cooperation with a rotatable drum, a brake comprising a non-rotatable support member having two diametrically opposite sleeves supported thereon and extending parallel to the axis of the brake, two shoes supported by said support member and adapted to anchor at either end according to the direction of drum rotation at the time of frictional contact with the drum, said shoes having adjacent separable ends at opposite sides of the brake normally resting against and therefore positioned by said sleeves, a shaft journaled in each of said sleeves, means actuated by turning the shafts on their axes to simultaneously urge both ends of both shoes toward the drum, a hydraulic cylinder adapted to simultaneously turn both of said shafts, and mechanical means for simultaneously turning said shafts independently of said hydraulic cylinder.

11. For use in a brake assembly having a rotatable drum, a non-rotatable support member, an anchor member mounted on said support member, and a shoe contacting said anchor member and adapted to transmit braking torque thereto while in frictional contact with the drum, mechanical applying means for moving said shoe into contact with the drum including an axially extending shaft journaled in said anchor member, and means actuated by turning said shaft to transmit applying force to the shoe, said means lying in the same plane as the axial center of said shoe.

12. For use in cooperation with a rotatable drum, a brake comprising a non-rotatable support member, an anchor member mounted on said support member, two shoes supported by said support member and adapted to be brought into frictional contact with the drum to oppose the rotation thereof, said shoes having adjacent separable ends normally resting against and therefore positioned by said anchor member, a shaft journaled in said anchor member, an arm on said shaft movable therewith as the shaft rotates, and a one-piece lever having direct pivotal connection with the arm, with one of the shoes at one side of the anchor member, and with the other shoe at the opposite side of the anchor member, whereby the force exerted by the arm on the lever spreads the adjacent separable ends of the shoes to bring them into contact with the drum.

RUDOLPH A. GOEPFRICH.

REFERENCES CITED

The following references are of record in the file of this patent:

UNITED STATES PATENTS

| Number | Name | Date |
|---|---|---|
| 2,140,753 | LaBrie | Dec. 20, 1938 |
| 1,949,176 | Norton | Feb. 17, 1934 |
| 2,173,582 | Fisher | Sept. 19, 1939 |
| 1,932,900 | LaBrie | Oct. 31, 1933 |